Patented Apr. 4, 1950

2,502,437

UNITED STATES PATENT OFFICE 2,502,437

TRI-NITRO 3-PENTADECYL PHENOLS

Charles R. Dawson, New York, and David Wasserman, Brooklyn, N. Y., assignors, by mesne assignments, to The Harvel Corporation, a corporation of New Jersey No Drawing. Application August 21, 1946, Serial No. 692,124

3 Claims. (Cl. 260—622)

This invention relates to novel compositions of matter and to methods and steps in the methods for producing them. In one of its more specific aspects the invention is directed to novel nitro derivatives of 3-pentadecyl phenol.

The novel compounds of the present invention are tri-nitro 3-pentadecyl phenol having the following general formula:

$C_6H.C_{15}H_{31}.OH(NO_2)_3$

These novel compounds find application in a number of different fields. They may be used as fast burning propellents, as explosives, and as therapeutic agents. They may be combined with petroleum oils as well as with various fractions thereof, such as gasoline and the fuel oils to improve them for their intended purposes.

One method for preparing one of said novel compounds is by the direct nitration of hydrogenated cardanol which is essentially 3-pentadecyl phenol. By employing the direct nitration method a tri-nitro 3-pentadecyl phenol is obtained, which is a pale yellow solid having a melting point of 58° C.–59° C. The yields of the tri-nitro 3-pentadecyl phenol produced by direct nitration of 3-pentadecyl phenol are low. Higher yields of this class of compounds may be obtained by the direct nitration of a sulfonated 3-pentadecyl phenol. It is preferable that the disulfonic acid derivative of hydrogenated cardanol be nitrated. During nitration the sulfonic acid groups are replaced by the nitro groups as evidenced by the fact that the purified solid reaction product gives a negative sodium fusion test for sulphur and analyzes correctly for $C_{21}H_{33}O_7N_3$.

Hydrogenated cardanol, consisting essentially of 3-pentadecyl phenol having the following formula:

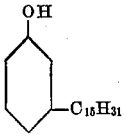

may be readily obtained by hydrogenating only the unsaturated side chain of cardanol or by hydrogenating cashew nut shell liquid and then separating this compound from the other components of the hydrogenated cashew nut shell liquid. The manner for the production of this compound is disclosed in the patent to S. Caplan No. 2,181,119, issued on the 28th day of November 1939.

The following examples of nitrating 3-pentadecyl phenol are set forth merely to illustrate the various methods for producing the novel nitro compounds and are not to be construed in a limiting sense.

Example 1

10 g. of 3-pentadecyl phenol was dissolved in 40 cc. of chloroform in a 250 cc. beaker and cooled to 0° C. To this was added dropwise 6.7 g. of fuming nitric acid (94%) with stirring to keep the temperature below 10° C. with the aid of an ice bath. After the last addition of acid, the temperature of the mixture was slowly raised to 60° C. over a period of fifteen minutes, and the mixture was stirred at that temperature for an additional fifteen minutes. The nitration mixture was then poured into a separatory funnel containing about 150 g. of ice water, and after swirling slowly the aqueous lower layer was removed and discarded. The upper layer was transferred to a distilling flask containing 200 cc. of water; the chloroform was removed in vacuo, and the residual nitrated phenol and water mixture cooled to 0° C. by the addition of ice. The solid tri-nitro-3-pentadecyl phenol was separated by filtration, washed with water, and dried in vacuo. This red colored solid melted at 45° C.–48° C. and weighed three grams (23% yield). After four recrystallizations from a mixture of "Skelly solvents B and D" which are petroleum fractions boiling at 30° C.–60° C. and 90° C.–110° C. respectively, the melting point remained constant at 58° C.–59° C. The pure tri-nitro compound was a pale yellow solid in the form of needles weighing one gram.

Example 2

A sulfonic acid derivative of hydrogenated cardanol was prepared by reacting 100 g. of hydrogenated cardanol with 70 g. of concentrated sulfuric acid at 100° C. for one hour. 20 g. of a red brown solid was obtained on cooling the reaction mixture to room temperature. This solid was dissolved in 95 cc. of dioxane and stirred at 0° C.–10° C. in a 3-neck flask while 10.5 g. of fuming nitric acid (90%) was added slowly. After the last addition of nitric acid the temperature of the mass was permitted to rise slowly to room temperature and then finally the reaction mass was warmed to 80° C. for a few minutes and then allowed to cool. After cooling the mixture to room temperature, more of the concentrated sulfuric acid (8 g.) was added with stirring and then more fuming nitric acid (7.8 g.) was added. The reaction mixture was then refluxed at about 100° C. for fifteen minutes and allowed to cool to room temperature. After cooling, the reaction mass was poured onto ice in water and a pale yellow solid separated. The solid was recovered by centrifugation and washed with water in a centrifuge cup. The water was then decanted and the yellow solid was dissolved in hot methanol. On cooling the methanol solution in the refrigerator, 10 g. of yellow solid, melting at 82° C.–86° C., was obtained. Yield 58%. A sample of this tri-nitro 3-pentadecyl phenol, recrystallized five times from "Skelley D Solvent," and melting at 89° C.–90° C., was obtained. It appeared to be similar in some properties to picric acid and it analyzed as follows:

Analysis: Calculated for $C_{21}H_{33}O_7N_3$; calculated: C, 57.41, H, 7.58; found: C, 57.76, H, 7.89.

Having thus described our invention, what we claim and desire to protect by Letters Patent is:

1. A novel compound selected from the group consisting of tri-nitro 3-pentadecyl phenols having melting points of about 58° C.–59° C. and about 89° C.–90° C. respectively.

2. A novel compound being tri-nitro 3-pentadecyl phenol, said compound being a solid melting at 58° C.–59° C.

3. A novel compound being tri-nitro 3-pentadecyl phenol, said compound being a solid melting at 89° C.–90° C.

CHARLES R. DAWSON.
DAVID WASSERMAN.

REFERENCES CITED

The following references are of record in the file of this patent:

Cousin et al., J. Proc. Roy. Soc. N. S. Wales, vol. 70, pages 413–27 (1937); Chemical Abstracts, vol. 31, col. 6637 (1937).